US009401918B2

(12) United States Patent
Lu et al.

(10) Patent No.: US 9,401,918 B2
(45) Date of Patent: Jul. 26, 2016

(54) USER TO USER DELEGATION SERVICE IN A FEDERATED IDENTITY MANAGEMENT ENVIRONMENT

(75) Inventors: HongQian Karen Lu, Austin, TX (US); Ksheerabdhi Krishna, Aix-en-Provence (FR); Kapil Sachdeva, Leander, TX (US)

(73) Assignee: GEMALTO SA, Meudon (FR)

( * ) Notice: Subject to any disclaimer, the term of this patent is extended or adjusted under 35 U.S.C. 154(b) by 61 days.

(21) Appl. No.: 14/007,328

(22) PCT Filed: Mar. 26, 2012

(86) PCT No.: PCT/EP2012/055281
§ 371 (c)(1),
(2), (4) Date: Sep. 24, 2013

(87) PCT Pub. No.: WO2012/130782
PCT Pub. Date: Oct. 4, 2012

(65) Prior Publication Data
US 2014/0020051 A1    Jan. 16, 2014

Related U.S. Application Data

(60) Provisional application No. 61/467,646, filed on Mar. 25, 2011.

(51) Int. Cl.
*H04L 29/06* (2006.01)
*G06F 21/62* (2013.01)
(Continued)

(52) U.S. Cl.
CPC .............. *H04L 63/10* (2013.01); *G06F 21/6218* (2013.01); *G06F 21/00* (2013.01); *G06F 2221/2137* (2013.01); *H04L 9/32* (2013.01); *H04L 29/06* (2013.01)

(58) Field of Classification Search
USPC ............ 726/1, 2, 8, 10, 21, 27; 380/247–250; 713/168–186
See application file for complete search history.

(56) References Cited

U.S. PATENT DOCUMENTS

2003/0145223 A1\* 7/2003 Brickell .................. G06F 21/33
726/10
2003/0149781 A1\* 8/2003 Yared ...................... G06F 21/41
709/229

(Continued)

FOREIGN PATENT DOCUMENTS

WO    WO2005050422 A1    6/2005
WO    WO2009/027082 A1    3/2009

OTHER PUBLICATIONS

Jinyuan Sun, et al: "Cross-Domain Data Sharing in Distributed Electronic Health Record Systems", IEEE Transactions on Parallel and Distributed Systems, IEEE Service Center, Los Alamitos, CA. vol. 21, No. 6, (Jun. 1, 2010), pp. 754-764, XP011294863, ISSN: 1045-9219 section 3.2, section 7.

(Continued)

*Primary Examiner* — Jeffrey Pwu
*Assistant Examiner* — Samuel Ambaye
(74) *Attorney, Agent, or Firm* — The Jansson Firm; Pehr Jansson (57) ABSTRACT

Method for providing user-to-user delegation service in federated identity environment, characterized in that it comprises a delegation or assignment step wherein a delegator specifies said delegation at an identity provider for delegating a privilege or task to a delegatee to be performed at a service provider.

11 Claims, 3 Drawing Sheets

(51) Int. Cl.
*H04L 9/32* (2006.01)
*G06F 21/00* (2013.01)

(56) References Cited

U.S. PATENT DOCUMENTS

2010/0319068 A1* 12/2010 Abbadessa et al. ............. 726/21
2012/0317624 A1* 12/2012 Monjas Llorente .. H04L 63/105
726/4

OTHER PUBLICATIONS

David W. Chadwick, et al: "Adding support to XACML for multi-domain user to user dynamic delegation of authority", International Journal of Information Security, Springer, Berlin, DE, vol. 8, No. 2, (Jan. 8, 2009), pp. 137-152, XP019664752, ISSN: 1615-5270 the whole document.

Sinnott, R. O., et al: "Supporting Decentralized, Security Focused Dynamic Virtual Organizations across the Grid", E-Science and Grid Computing, 2006. E-Science '06. Second IEEE Internaional Conference on, IEE, PI, (Dec. 1, 2006), pp. 22-22, XP031030702, DOI: 10.1109/E-Science.2006.261106 ISBN: 978-0-7695-2734-5.

PCT/EP2012/055281, International Search Report, Jun. 1, 2012, European Patent Office, P. b. 5818 Patentlaan 2 NL—2280 HV Rijswijk.

* cited by examiner

Fig. 5

USER TO USER DELEGATION SERVICE IN A FEDERATED IDENTITY MANAGEMENT ENVIRONMENT

FIELD OF THE INVENTION

The present invention relates generally to delegation service and more specifically to a new delegation framework supporting user-to-user delegation service in a federated identity management environment.

BACKGROUND OF THE INVENTION

Delegation is the process of an identified entity, called delegator, giving a mandate or a delegation assertion to another identified entity, called delegatee. The delegatee receives the privilege to act on behalf of the delegator at a service provider, who provides services to a requester.

In this specification, the following terminology is used:
- a privilege is a right to access specific resources or to perform certain tasks. A user may have a number of such privileges.
- a delegation is the act of temporarily or permanently transferring privileges from one entity to another.
- a delegator is the entity that transfers, i.e. delegates all or a subset of its privileges to a Delegatee.
- a delegatee is the entity that receives all or a subset of the delegator's privileges in order to use them on the delegator's behalf.
- a delegation assertion is an assertion of the correctness and authority for a delegation, issued by a Delegation Authority to a delegatee.
- a delegation authority or mandate authority is an entity that controls delegation and issues delegation assertions.

The delegation can be user-to-user, user-to-machine, or machine-to-machine. Existing research on delegation in federated identity management environments focuses on user-to-machine or machine-to-machine delegations. User-to-user delegation has been studied in role-based access control (RBAC) systems, and is typically used with specific service providers. As the Web becomes the ubiquitous computer, and more organizations, government, and businesses operate in and depend on federated identity management environments, user-to-user delegation over the web in such an environment becomes a required functionality. Furthermore, the delegation should also work with different access control models in addition to RBAC.

Access controls are security mechanisms that control how subjects, such as users, applications, and systems access and interact with objects, such as resources, other applications and systems. Access control includes identification, authentication, authorization, and accountability. All organizations and their systems or services must have access control policies and implementations to protect their resources and systems from unauthorized access.

Delegation is a mechanism of transferring access privileges from one subject to another. Such a privilege transfer must be authorized and must not violate organization/system's access control policy to prevent unauthorized access due to the delegation. Therefore, the delegation should be specified as a part of the access control policy. A delegation mechanism must associate and be authorized by the corresponding access control engine. However, recent research on delegation related to the federated identity and machine-to-machine delegations have focused on mechanisms and semantics but failed to establish the link between the delegation and access control.

There are three main types of access control models: discretionary, mandatory, and role-based. The discretionary access control model allows the owner of the resource to specify which subject can access a specific resource. Most operating systems of personal computers, such as Windows, Linux, Mac, have their models based on the discretionary access control. In a mandatory access control model, the system, not the resource owner, makes decisions based on a security label system and a mathematical model, with which data are classified and subjects have clearance labels. In a role-based access control, access decisions are made based on a pre-specified role assigned to the user. This is commonly used in a company or an organization. For example, a manager can access certain resources while an employee cannot. A system can also use a combination of these control models.

The eXtensible Access Control Markup Language (XACML) is a standard-based specification that can be used to specify and communicate access control policies across computer systems, internal or external to an organization. A current version is XACML 2.0. A XACML 3.0 version is working in progress, which includes the concept and process of delegation. However, XACML delegation deals with creation of new policies and tracing back "trusted policies".

Delegation in Role-Based Access Control (RBAC) can be done for roles or for individual permissions, by granting or transfer privileges. The granting delegation allows the delegated privileges to be available to both the delegator and the delegatee after a successful delegation operation. The transfer delegation transfers the delegated privileges to the delegatee after a successful delegation. Those privileges are no longer available to the delegator. The RBAC system must manage the delegation based on the access control policies. In doing so, it must answer the following two questions:
- Is a delegator authorized to delegate a role, privilege, or permission that is available to him?
- Can a role, privilege, or permission be delegated to a delegate?

In the context of delegation service in a federated identity management environment, service providers manage their own access controls and, hence, the permission to delegate. The service provider (SP) must find answers to the above question when a user delegates, when a user invokes a delegation, and when a user's privileges have been changed. This applies to any access control model, not just RBAC.

The system called the Shibboleth System is a SAML 2.0 based, open source software package for web single sign-on (SSO) across or within organization boundaries. The Shibboleth proposes a solution to a proxy authentication problem: how to authenticate a service to which a user may have authenticated to, and who wishes to invoke another service on the user's behalf? For example, a user authenticates to a web portal through an Identity provider (IdP), and then the portal accesses a web service provider as the user. This solution solves the problem of user-to-machine delegation, that is, the user delegates some of his privileges to the web portal to access the service provider on his behalf.

The Shibboleth solution uses two SSO's (Single Sign-On) through the same IdP:
- A Web Browser SSO to portal, i.e. user login to portal: an SAML assertion in response to the authentication request from the IdP includes a subject NameID and an additional subject confirmation for the portal that enables the portal to use later to authenticate.
- A Portal SSO to the SP: an SAML assertion in response to the authentication request from IdP includes the same subject NameID and subject confirmation as in the first authentication statement and a condition that has a <Delegate> element with the NameID as the portal.

Figure 1:
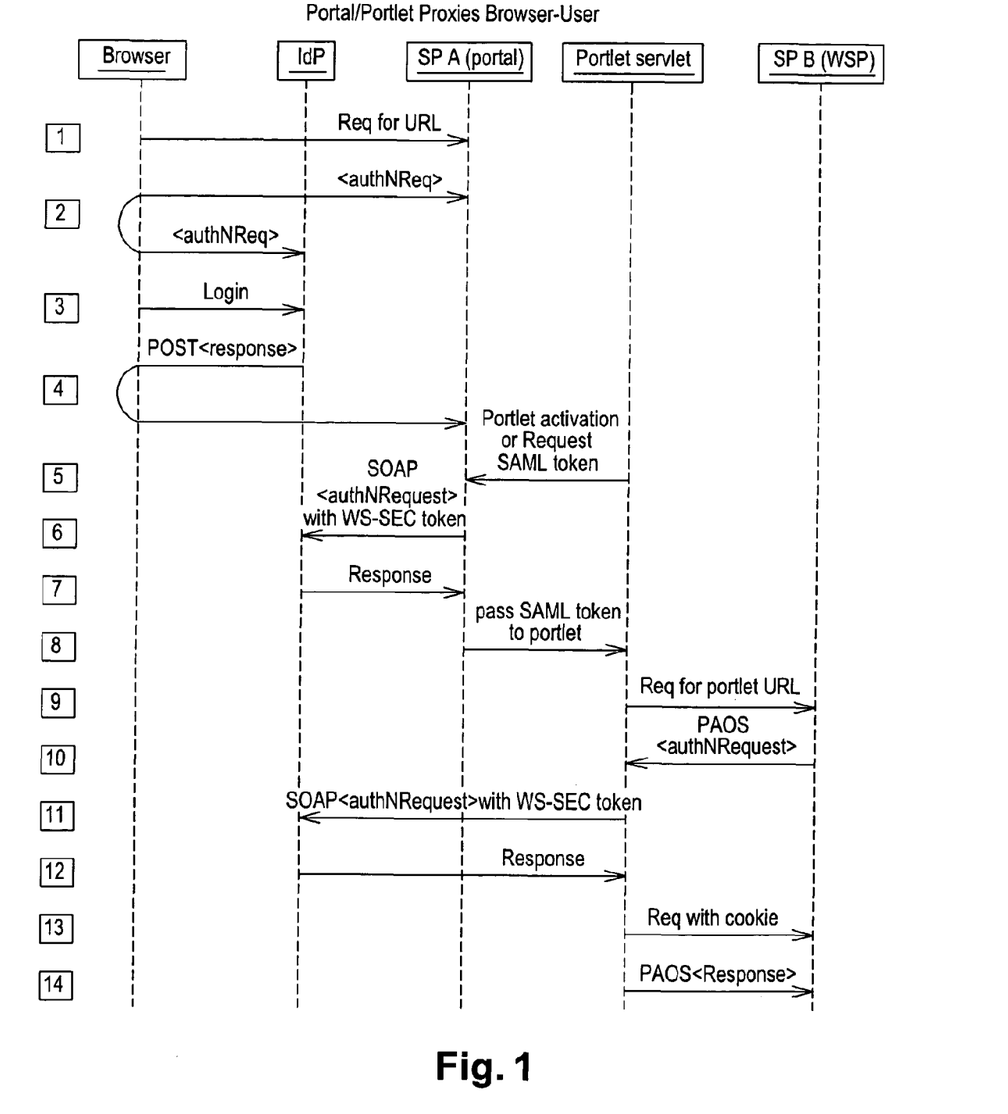
FIG. 1 schematically shows a flowchart according to Shibboleth delegation.

The delegation assertion is enabled by the first authentication statement and is built into the second authentication statement. Therefore, the delegation assertion is issued and signed by the IdP as represented in FIG. 1.

A delegation framework for Liberty Alliance Project, due to the lack of support in Liberty specifications, is also proposed by Alrodhan and Mitchell. Nevertheless this framework is also designed for user-to-machine delegation. It extends the attribute statement in the SAML assertion to form a delegation assertion. The IdP issues and signs the delegation assertion with the user consent i.e. delegator or privilege owner consent. The Single Sign-On Profiles described in the Liberty ID-FF 1.2 specification provides the base for this delegation framework. This solution described the framework based on three profiles: artifact profile, POST profile, and enable-client profile. The artifact-profile-based requires an additional roundtrip to the IdP and the enable-client-profile-based requires installation of a client to the user's computer.

This framework is similar to Shibboleth's delegation in that the delegatee, through the user agent, gets a delegation assertion from the IdP and then presents it to the target. The differences include using different SSO profiles, different assertions and different ways of encoding the delegation assertion. Shibboleth uses Authentication request and a condition with <Delegate> element whereas the delegation framework of Alrodhan and Mitchell uses a general assertion request, and the attribute statement.

OAuth is an open protocol that enables websites or applications called Consumers, to access protected resources from another website called Service Provider, on behalf of a user, without requiring the user to disclose his login credentials at the service provider to the Consumers. As such, OAuth provides a protocol for user-to-machine delegation, i.e. the user delegates to the Consumer to access some of his resource at the Service Provider. The OAuth protocol has three steps:

The Consumer obtains an unauthorized Request Token from the Service Provider, and redirects the user to the Service Provider.

The user authorizes the Request Token at the Service Provider, which redirects the user back to the Consumer after the authorization.

The Consumer exchanges the authorized Request Token for an Access Token, which is used to access the protected resource at the Service Provider on behalf of the user.

OAuth is for example used for web applications to access user specific resources on sites with the user's authorization without revealing user's login credentials. OAuth is designed for user-to-machine delegation and is not suitable for user-to-user delegation, as the user, i.e. the delegatee cannot process the protocol messages.

Existing delegations in federated identity frameworks focus on user-to-machine delegation. This allows a service provider A to access user's resources at the service provider B on the user's behalf.

The user-to-machine delegation methods cannot apply to user-to-user delegation because human cannot perform complex cryptographic operations.

SUMMARY

It is then an object of the invention to provide a new delegation framework that supports user-to-user delegation service in a federated identity management environment, providing a delegation service so that individual SP does not need to manage delegations.

Thereto, the present invention a method for providing user-to-user delegation service in federated identity environment, characterized in that it comprises a delegation or assignment step wherein a delegator specifies said delegation at an identity provider for delegating a privilege or task to a delegatee to be performed at a service provider.

According to another aspect of the invention, the service provider may authorize delegations based on access control rules.

According to another aspect of the invention, the method may comprise associating a delegation invocation step with a user authentication step wherein the delegatee may request to login at the service provider, which delegates the user authentication to the identity provider; the identity provider may authenticate the delegatee, and if the authentication step is successful and if the identity provider finds delegations for the delegatee, the delegatee is able to choose which delegation to perform.

According to another aspect of the invention, the identity provider may embed the chosen delegation assertion in the authentication step and may send it to the service provider.

According to another aspect of the invention, the delegation may be a simple delegation, applicable to a discretionary access control model, wherein the delegator may give all privileges to the delegatee for a specified time period.

According to another aspect of the invention, a delegation policy may be in a metadata stored in the service provider, applicable to discretionary and role-based access control models, wherein during the assignment step, identity provider may check the delegation policy.

According to another aspect of the invention, the delegation may be applicable to any access control models, wherein the identity provider may ask the service provider dynamically for privileges that the delegator can delegate to the delegate.

According to another aspect of the invention, the method may comprise a delegation revocation step wherein the identity provider provides means for a delegator to revoke a delegation, said revocation being under the delegator's responsibility at the identity provider.

According to another aspect of the invention, the method may comprise a delegation revocation step wherein the identity provider removes the delegation to the delegate by the delegator from its record.

According to another aspect of the invention, the delegation revocation step may be done by the service provider instead of being initiated by the delegator or by the identity provider.

According to another aspect of the invention, the identity provider may clean up its delegation repository periodically.

The invention also provides a system for providing user-to-user delegation service in federated identity environment. This system may comprise an identity provider, more than one service providers, delegators, and delegatees, wherein the identity provider acts as the delegation authority, managing delegations for the service providers.

The invention also provides a use of such method for providing user-to-user delegation service in federated identity environment in such system.

Thanks to this invention, the delegation allows a user A to delegate some of his privileges at a service provider (SP) to a user B. The delegation service includes delegation assignment, delegation invocation, and delegation revocation. The identity provider (IdP) acts as the delegation authority that manages delegations. The delegator assigns delegations at the IdP. The delegatee is to perform the delegated tasks at the specified service provider (SP). The SP obtains delegation assertions from the IdP. Delegations can be revoked either by the delegator or by the SP.

The SPs' access control models play an important in the design of this delegation framework. Service providers must ensure that delegations do not violate their access control policies. For this purpose, the delegation framework according to the invention has build-in mechanisms allowing SPs to exercise access controls throughout delegations' life cycles. These mechanisms are advantageously independent of SPs' access control models.

The delegation service is advantageously applicable to any access control models that SPs use. Most access control models, except some implementations of DAC, require both delegator and delegatee have accounts with the system.

BRIEF DESCRIPTION OF THE DRAWINGS

The various aspects, features and advantages of the invention will become more fully apparent to those having ordinary skill in the art upon careful consideration of the following Detailed Description, given by way of example thereof, with the accompanying drawing described below.

DETAILED DESCRIPTION

The present invention may be understood according to the detailed description provided herein.

Figure 2:
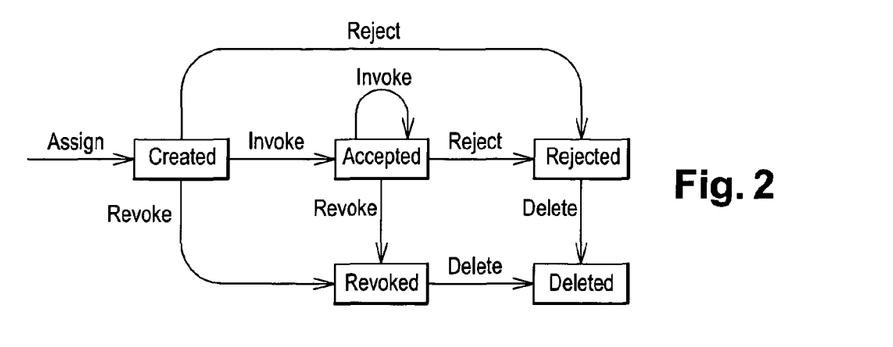
FIG. 2 schematically shows a flowchart of a life cycle of delegation according to the invention.

As explained above, delegation is an act of transferring temporarily or permanently privileges. When a delegator delegates to a delegatee, the IdP creates a delegation record, or called statement, or simply delegation. The life cycle of the delegation as represented in FIG. 2, starts with the creation and ends with the deletion. A delegation record includes the delegator, the service provider (SP), the delegatee, the resources that the delegatee is to access, the actions that the delegatee can do after obtaining the resource, and other things, such as assignment date and time, valid period, delegator's signature, and so on. When the delegator assigns a delegation, the identity provider (IdP) creates a delegation record; the delegation is in the created state. The invocation of the delegation by the delegatee transfers the delegation into the accepted state.

Service providers (SPs) in the same environment, called circle of trust, can use this delegation service, instead of managing delegations individually. The delegation allows a user A to delegate some of his privileges at a service provider (SP) to a user B. The delegation service includes delegation assignment, invocation, and revocation. The identity provider (IdP) acts as the delegation authority that manages delegations. Service providers must ensure that delegations do not violate their access control policies. The delegation framework provides opportunities for service providers to consult their access control engines to decide if the delegatee should be authorized to perform the requested services. Therefore the framework is not tied to any particular access control models.

The present invention provides various embodiments, which allow service providers to exercise different types of access control and manage the complexities of using delegation accordingly. A service provider specifies if it allows delegation, and if it does, what delegation option does it supports, all inside a metadata. The default setting in the metadata is "no delegation".

The interactions between the SPs and the IdP follow the SAML 2.0 and XACML standards.

In a first embodiment, service providers do not make changes or makes minimum change to use the delegation mechanism provided by the identity provider. This embodiment is only applicable to the discretionary access control and the delegator gives all of his privileges at the service provider to the delegatee for a specified period of time.

In this first embodiment in which the SP changes are not necessary, a delegator always delegates all his privileges to a delegatee at a service provider, that is, the delegator allows the delegatee to login to the service provider as the delegator. For example, the delegator can give his login credentials, such as username/password or smart card/PIN, to the delegatee at the SP.

In a delegation Assignment, the method comprises the following steps: the delegator authenticates to the IdP, specifies the delegatee, selects the SP that he wants the delegatee to access, and specifies other constraints, such as validation period. The IdP creates a delegation. The delegator or the IdP informs the delegatee about the delegation.

In a delegation Invocation, the method comprises the following steps: the delegatee logs in to the SP, which is redirected to the IdP. Finding a delegation, the IdP asks if the user wants to login as himself or as the delegator. If the delegatee selects the delegator, the IdP authenticates the user and generates an authentication assertion for the delegator. This enables the delegatee logs into the SP as the delegator.

This model is advantageously simple as it requires no changes to SPs and allows anonymous delegation.

The IdP specifies the delegatee information in an advisory fashion. The SP has the option to process the delegatee information. One way to implement this is to use an additional <saml:SubjectConfirmation> in the assertion that the IdP sends to the SP as the response to the authentication request. A SAML 2.0 code snippet which illustrates an assertion with the delegation information is for example:

```
<Assertion>
    <Issuer> ... URI of the IdP ... </Issuer>
    <ds:Signature> ... IdP's signature ... </ds:Signature>
    <Subject>
    <NameID> ... URI of the delegator ... <NameID>
    <SubjectConfirmation> // about the delegator
    <SubjectConfirmation Method="sender-vouches>
        <SubjectConfirmationData> // about the delegatee
    </SubjectConfirmation>
    </Subject>
    <Conditions>
    <AuthnStatement>
</Assertion>
```

Alternatively, the delegatee's information can be expressed in an attribute statement inside the assertion. A SAML 2.0 code snippet which illustrates an assertion with the delegation information is for example:

```
<Assertion>
    <Issuer> ... URI of the IdP ... </Issuer>
    <ds:Signature> ... IdP's signature ... </ds:Signature>
    <Subject> ... Information about the delegator ... </Subject>
    <Conditions>
    <AuthnStatement>
    <AttributeStatement>
        <Attribute Name="Delegation">
            <AttributeValue>
                <Delegator>
                <Delegatee>
                ... other attribute values such as assignment
                time, valid period, and delegator signature ...
            </AttributeValue>
        </Attribute>
    </AttributeStatement>
</Assertion>
```

The service provider has the option to process the delegation information, to decide if or not providing services to the delegatee, and to record the delegation for auditing purposes.

In a delegation Revocation, the IdP provides means for a delegator to revoke a delegation. It is the delegator's responsibility to revoke the delegation at the IdP.

In a second embodiment, the service provider can express its delegation policy or a subset of the policy inside the metadata. This embodiment is applicable to discretionary access control or simple role-based access control, with which the service provider can express the delegation policies without specifying individual users. The delegator can advantageously specify privileges that he wants to delegate. The service providers describe their delegation policies using XACML. For example the following XACML 3.0 code snippet illustrates a delegation policy wherein the SP is an online merchant, whose delegation policy says that any user who has an account at the SP can delegate the order tracking and award point tracking to anyone who can be authenticated by the IdP. The delegatee does not necessarily have an account at the SP.

```
<Policy>
    <Description>
        Simple merchant delegation policy
    </Description>
    <Target> // <AnyOf>, <AllOf> are omitted for simplicity
        <Match>
            <AttributeValue> User Of IdP </AttributeValue>
            <AttributeDesignator
Category="urn.oasis:names:tc:xacml:3.0:attribute-
category:delegated:urn:oasis:names:tc:xacml:3.0:subject-category:access-
subject">
        </Match>
        <Match>
            <AttributeValue> OrderInfo </AttributeValue>
            <AttributeDesignator
Category="urn.oasis:names:tc:xacml:3.0:attribute-
category:delegated:urn:oasis:names:tc:xacml:3.0:subject-
category:resource">
        </Match>
        <Match>
            <AttributeValue> AwardPoints </AttributeValue>
            <AttributeDesignator
Category="urn.oasis:names:tc:xacml:3.0:attribute-
category:delegated:urn:oasis:names:tc:xacml:3.0:subject-
category:resource">
        </Match>
        <Match>
            <AttributeValue> View </AttributeValue>
            <AttributeDesignator
Category="urn.oasis:names:tc:xacml:3.0:attribute-
category:delegated:urn:oasis:names:tc:xacml:3.0:subject-category:action">
        </Match>
        <Match>
            <AttributeValue> User of this SP </AttributeValue>
```

-continued

```
            <AttributeDesignator
                Category="urn.oasis:names:tc:xacml:3.0:attribute-
category:delegate"/>
        </Match>
    </Target>
    <Rule RuleId="Rule1" Effect="Permit">
        <Target/>
    </Rule>
</Policy>
```

The delegation Assignment comprises the following steps wherein the delegator first authenticates to the IdP. Then the delegator selects the SP that he wants to delegate some tasks. The IdP reads the delegation policy in the metadata of the SP and presents delegatable resources and actions, if any, to the delegator. The delegator specifies the delegatee, the tasks i.e. the resources and the actions, and other constraints, such as a validation period. The IdP creates a delegation. The IdP may also ask the delegator to digitally sign the delegation for non-repudiation. Then the delegator signs the delegation if required. The delegator or the IdP informs the delegatee about the delegation.

When the delegatee requests to perform a delegated task at the SP, he invokes a delegation.

Figure 3:
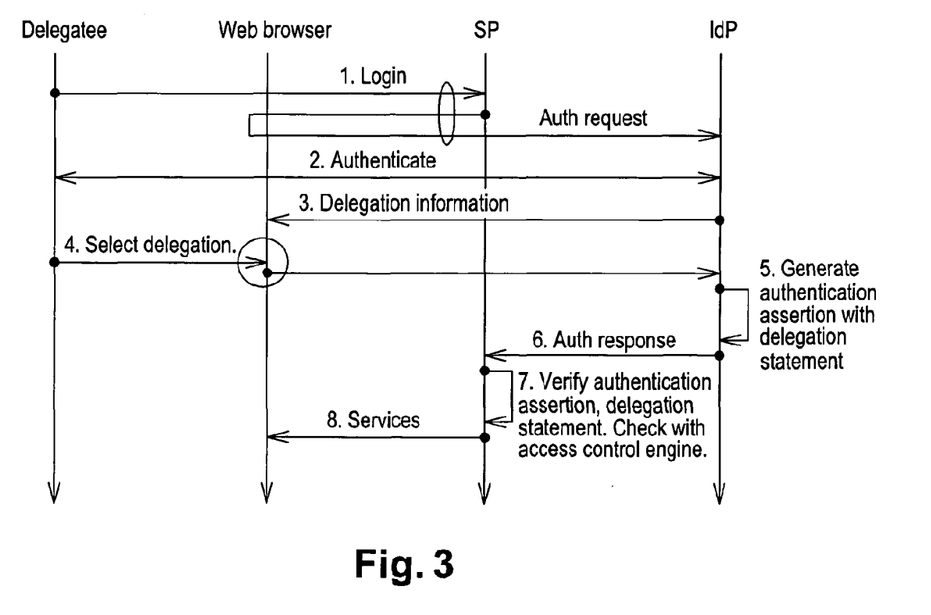
FIG. 3 schematically shows a flowchart a delegation invocation according to an embodiment of the invention.

In the delegation invocation, as shown in FIG. 3, the method comprises the following steps: the delegatee logs in to the SP, which is redirected to the IdP. The IdP then verifies the delegatee's identity. The IdP finds delegation(s) for the delegatee at the SP and asks him if he wants to login as himself or as a delegatee and for which delegator. The delegatee then selects login as a delegatee and specifies the delegator. The IdP generates an authentication assertion for the delegatee with a delegation attribute statement specifying delegator, privileges, and other constraints. The IdP then sends the authentication assertion to the SP. The SP verifies the authentication assertion and the delegation statement and consults with its access control engine for both the delegator and delegatee. If all is well, the SP presents services to let the delegatee to perform the delegated tasks.

The IdP generates an authentication assertion in response to the authentication request from the SP. The subject in the assertion is the delegatee. The assertion in addition includes an attribute statement about the delegation and a code snippet which illustrates the assertion is for example:

```
<Assertion>
    <Issuer> ... URI of the IdP ... </Issuer>
    <ds:Signature> ... IdP's signature ... </ds:Signature>
    <Subject> ... Information about the delegatee ... </Subject>
    <Conditions>
    <AuthnStatement>
    <AttributeStatement>
        <Attribute Name="Delegation">
            <AttributeValue>
                <Delegator>
                <Delegatee>
                <Privilege>
                    <Description> <Service> <Resource>
                    <Action> ...
                </Privilege>
                ... other attribute values such as assignment time,
                valid period, and delegator signature ...
            </AttributeValue>
        </Attribute>
    </AttributeStatement>
</Assertion>
```

The SP must process the delegation information, verifies the delegation statement, and consult with its access control engine to decide if it should provide the requested services. Specifically, the SP verifies the following steps:
the delegation is in the valid period.
the service request is specified in the statement.
the requester is the delegatee specified in the statement.
the signature of the assertion is valid and the certificate is not revoked.
the delegator is authorized to perform the delegated privileged task.
the delegator is authorized to delegate the privileged task.
the delegatee has the privilege to perform the delegated task.

It will be understood that other optional constraints can be met.

The checking on authorizations is necessary because conditions may have changed since the last time that the SP queried the access control engine regarding the delegator and the delegatee when the IdP requested the privilege list in setting up the delegation.

In the delegation revocation, the IdP provides means for a delegator to revoke a delegation. It is the delegator's responsibility to revoke the delegation at the IdP.

In a third embodiment, the method is independent of the access control mechanism that a service provider has. A service provider can choose this option if it has a more complex role-based access control, a mandatory access control, or any access controls that are too complex or too sensitive to be expressed in the metadata with the IdP. For example, a SP's access control policies may bond to individuals and stored in a database. In these cases, either the delegator knows what he can delegate, or the delegator or the IdP must ask the service provider what the delegator can delegate. The SP must consult its access control engine in order to provide the list.

For the delegation assignment, a delegator wants to delegate some tasks to a delegatee, to be done at a SP. The IdP does not know what privileges that the delegator can delegate. The IdP's role is to manage the delegation and to tell the SP that the delegator indeed has delegated certain privileges to the delegatee. The SP must exercise the access control, that is, to ensure that the delegator has and can delegate these privileges and the delegatee is authorized to perform the tasks.

For doing so, the delegator specifies the SP, the delegatee, and the privileges i.e. the resources and the actions that he wants to delegate. The IdP creates a delegation. This embodiment assumes that the delegator knows exactly what he can delegate.

In a variant, The IdP asks the SP if such delegation can be authorized. This can be done for example by the IdP making a <xacml-samlp:XACMLAuthzDecisionQuery>, which is specified in the XACML SAML profile, to the SP. If the SP responds with a success, the IdP creates a delegation. Otherwise, the IdP asks the delegator to make a modification and repeat the process. This variant assumes that the delegator mostly likely know what he can delegate.

Figure 4:
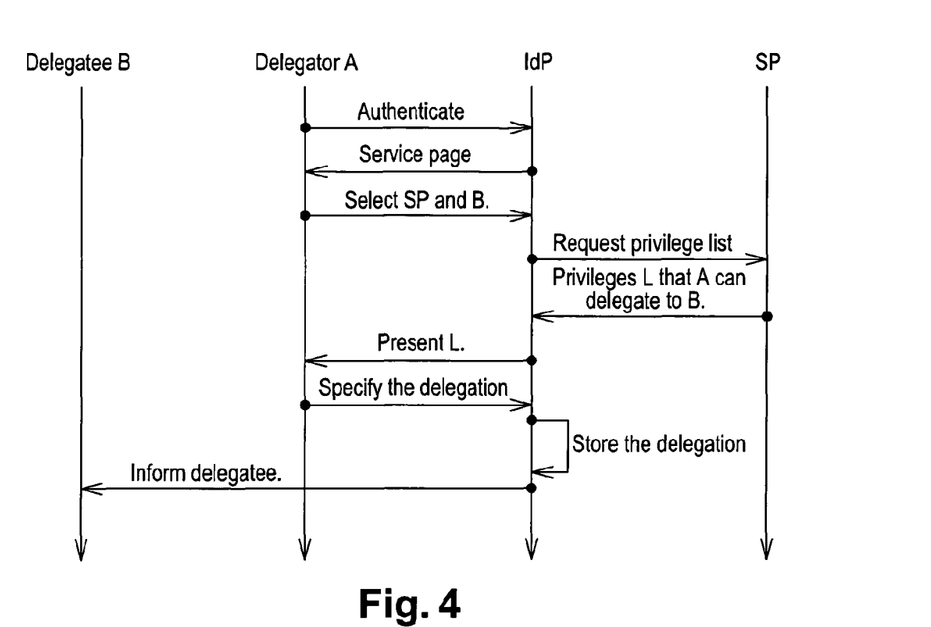
FIG. 4 schematically shows a flowchart of a delegation assignment according to an embodiment of the invention.

In a further variant of this third embodiment, the delegator specifies the SP and the delegatee. The IdP asks the SP about privileges that the delegator can delegate to the delegatee. The SP responds with a list, which may be empty. The IdP asks the delegator to make a selection. When needed, the IdP asks the SP if such delegation can be authorized. If the SP responds with a success, the IdP creates a delegation. The query for privileges is for example implemented using <xacml-samlp:XACMLPolicyQuery>. This further variant does not make assumptions about if the delegator knows what he can delegate. For doing so, the delegation assignment comprises for example the following steps as represented in FIG. 4:

the Delegator A authenticates to the IdP.
the delegator A selects the SP that he wants the delegatee B to access.
the IdP finds from the SP the privileges that the delegator A can delegate to the delegate B.
the IdP presents a list containing those privileges i.e. resources and actions to the delegator A.
the delegator A selects privileges to delegate to the delegate B from the list and other constraints, such as valid time period.
the IdP creates a delegation. Optionally, the IdP asks the SP if such delegation can be authorized before creating a delegation.
the IdP may ask the delegator to digitally sign the delegation for non-repudiation.
the delegator signs the delegation if required.
the delegator or the IdP informs the delegatee about the delegation.

The difference between these steps of this third embodiment and the second embodiment is that in the second embodiment, the IdP finds what the delegator can delegate from the SP's metadata whereas in the third embodiment, the IdP asks the SP what the delegator can delegate.

In this third embodiment, the delegation Invocation comprises the same steps than the delegation Invocation of the second embodiment.

As described above, the IdP is the delegation authority that manages delegation assertions. The SP gets the delegation statement from the IdP as part of authentication assertion. The SP does not receive delegation assertion from anyone else. The SP is able to store the delegation assertion for audit purposes, but does not do it for reuse. The delegation assertion is always dynamically acquired. Therefore, the SP does not need to check for the delegation status.

A delegation revocation may be initiated by the delegator or by the SP. After receiving a revocation request, the IdP authenticates and verifies the request. If the request is authentic and verifiable, the IdP removes the request delegation from its delegation list or database, instead of creating a separate list.

The delegation situation is very different from that of SSL certificate. The SP receives a SSL certificate from a third party. Before using it, the SP checks to see if the certificate is still valid by consulting with the Certificate Revocation List (CRL) that contains a list of revoked certificate, or using an Open Certificate Status Protocol (OCSP) service that provides revocation status of a certificate. The SP obtains the delegation assertion from the delegation authority, which is the IdP. The SP can verify the assertion by itself and does not need to check with the IdP for the validity of the assertion, and the IdP does not need to keep a list or provides a service for such purpose.

In this third embodiment, when the delegator for example revokes a delegation at the identity provider who manages delegations, the method comprises the following steps:
the delegator A logs in to the IdP.
the delegator A revokes his delegation to the delegatee B.
the IdP removes the delegation to delegate B by the delegator A from its record. Therefore when the delegatee B authenticates to the IdP, he will not have the option to act as a delegatee for the delegator A.

Figure 5:
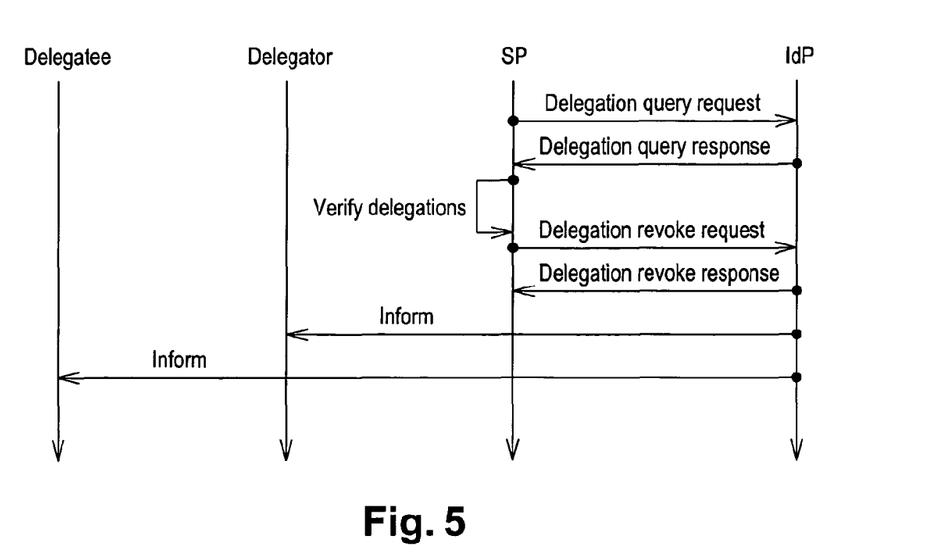
FIG. 5 schematically shows a flowchart of a revocation by the service provider according to an embodiment of the invention.

As shown in FIG. 5, the revocation in another embodiment is done by the SP instead of being initiated by the delegator or by the IdP. When a user's privileges are reduced or removed, the service provider should find out if there are outstanding delegations relevant to this user. If so, the SP needs to examine each of the delegations to see if they are still valid. If the user was a delegator and he no longer has privilege to delegate the task, or if the user was a delegatee and he no longer has the privilege to perform the delegated task, then the SP sends a revocation request to IdP to revoke the delegation. The IdP then informs the delegator and the delegatee.

Alternatively to the revocation by the SP and the revocation by the delegator, the IdP cleans up its delegation repository periodically. For delegations that have not been activated for a while or just for any delegations, the IdP makes XACML authorization decision query to the SP. If the response is negative, the IdP removes the delegation. This avoids using the SAML extension for delegation revocation.

The revocation delegation of this third embodiment advantageously does not require maintaining a revocation list nor require a separate query on the delegation status.

Once the delegatee is then informed of the delegation assignment either by the delegator or by the identity provider, the delegatee examines the delegation, for example, from the received information or the IdP provides a service for the delegatee to do so. The request to the SP by the delegatee to perform the delegated tasks is a form of delegation acceptance. The IdP may also provide a service for the delegatee to explicitly accept the delegation.

If the delegatee rejects the delegation, he informs the delegator, who either modify the delegation or revoke the delegation at the IdP. The IdP may also provide a service for the delegatee to reject a delegation. Revocation of acceptance can be done the same as rejection.

According to the invention, delegation assignment, query, invocation, and revocation require communications between the SP and the IdP. As previously described, SAML 2.0 assertions are used as message exchange format and extended as needed. SAML protocols and bindings are used to transport the delegation messages.

SAML protocol is a request and response protocol. The requester sends a request, and the responder processes the request and sends a response. SAML 2.0 standard is used to format the delegation request and response.

SAML 2.0 attribute query <AttributeQuery> is used to query attributes for the subject. The <AttributeQuery> is of AttributeQueryType, which extends SubjectQueryAbstractType. <AttributeQuery> is used to query the privileges that the delegator can delegate to the delegatee, and existing delegations for a delegator or delegatee. The response to the <AttributeQuery> is an attribute assertion or query status.

In the further variant of the third embodiment, when the delegator specifies the SP and the delegate, the IdP asks SP what privileges that the delegator can delegate to the delegatee. This is for example done by using the XACML policy query <xacml-samlp:XACMLPolicyQuery> specified in the XACML SAML profile. A code snippet which illustrates the query is for example:

```
<xacml-samlp:XACMLPolicyQuery>
    <saml:Issuer>
    <ds:Signature>
    <Attribute ID>
    <Attribute IssurInstant>
    ... ...
    <xacml-context:Request>
        <xacml:Attributes>
            <Attribute name="user">
                <AttributeValue> name or id of the
                delegator </AttributeValue>
            </Attribute>
            <Category
                name="urn.oasis:names.tc:xacml:3.0:attribute-
                category:delegate">
```

-continued

```
        </Attributes>
        <xacml:Attributes>
            <Attribute name="user">
                <AttributeValue> name or id of
                delegatee </AttributeValue>
            </Attribute>
            <Category name="urn.oasis:names.tc:xacml:3.0:attribute-
category:delegated:urn:oasis:names:tc:xacml:3.0:subject-category:access-
subject">
        </Attributes>
        <xacml:Attributes>
            <Category
                name="urn.oasis:names.tc:xacml:3.0:attribute-
                category:delegate">
            <Category name="urn.oasis:names.tc:xacml:3.0:attribute-
category:delegated:urn:oasis:names:tc:xacml:3.0:subject-
category:resource">
            <Category name="urn.oasis:names.tc:xacml:3.0:attribute-
category:delegated:urn:oasis:names:tc:xacml:3.0:subject-
category:action">
        </Attributes>
    </Request>
    <Attribute name="ReturnPolicyIdList">
        <AttributeValue>true</AttributeValue>
    </Attribute>
... ...
</XACMLPolicyQuery>
```

In response, the SP sends a <samlp:Response>, which contains an XACMLPolicy assertion that has a statement of the type xacml-saml:XACMLPolicyStatementType. This statement contains policies that the query requested.

When a user's privileges have been removed or reduced, the SP examines all outstanding delegations associated with this user, either as a delegator or as a delegatee. For this purpose, the SP sends query request to the IdP and the IdP responds with an attribute assertion containing relevant delegation statements, if they exist. A code snippet which illustrates the query is for example.

```
<samlp:AttributeQuery>
    <saml:Issuer>
    <ds:Signature>
    <Attribute ID>
    <Attribute IssurInstant>
    ... ...
    <Subject>
        <NamdID id=... delegator or delegatee's id...>
        ... ...
    </Subject>
    <Attribute name="Delegation">
    ... ...
</AttributeQuery>
```

The IdP responds with an assertion containing one or more attribute statements about the delegations.

The authentication request is the standard SAML 2.0 <AuthnRequest>. When sending an authentication request, the SP does not know anything about delegation. The delegatee either requests to perform delegation tasks at the IdP during authentication or at the SP after authentication.

When access privileges of a principal privilege have changed and existing delegations are no longer valid, the SP sends a delegation revocation request to the IdP to revoke relevant delegations. While neither SAML 2.0 nor XACML 2.0/3.0 specified revocation, the SAML syntax is used to define it. The delegation revocation request and response are similar to authentication request and response, in which the SP sends a request to the IdP. The IdP fulfills the request and sends an assertion in response. A request is for example:

```
<DelegationRevokeRequest>
    <Issuer>
    <ds:Signature>
    ... ...
    <Subject>
    <Attribute name="Delegation">
        <Delegator>, <Delegatee>, <Resource>, etc.
    </Attribute>
    ... ...
</DelegationRevokeRequest>
```

The elements in <Delegation> are optional. The request has the following rules:

If no <Resource> is specified, the SP requests to revoke all delegations associated with <Delegator>, <Delegatee>, or both.

If none of <Delegator> and <Delegatee> exists, the SP requests to revoke all delegations associated with the subject and <Resource>.

If there is <Delegator> but no <Delegatee>, the SP requests to revoke all delegations that the subject is a delegator and delegated <Resource> to any delegatees.

If there is <Delegatee> but no <Delegator>, the SP requests to revoke all delegations that the subject is a delegatee and was delegated for <Resource> by any delegators.

If there are both <Delegator> and <Delegatee>, the SP requests to revoke all delegations that associated to <Delegator>, <Delegatee>, and <Resource>. The subject is a delegator or a delegatee.

The response from the IdP contains the status of the revocation.

It will be understood that the SP may also choose a combination of the second and the third embodiments.

According to the invention, the communication between SP and IdP must be secured using SSL/TLS and strong cipher suites. The delegation statement must be signed by the identity provider who manages the delegations. All queries and requests between the IdP and service providers must be signed by the requester to provide authenticity and non-repudiation. All responses to queries and requests between IdP and service providers must be signed by the responder to provide authenticity and non-repudiation. The SP must not reuse delegation statement.

Service providers choosing to use the first embodiment without processing the delegation part of the authentication assertion must understand that the user may not be the one whom the service provider thinks. The delegatee may have logged in on behalf of the delegator. This embodiment should only be used by service providers who do not have sensitive or private information of the users and to whom security is not a concern.

Service providers choosing to use the first embodiment should process the delegation part of the authentication assertion to understand who has actually logged in, consult its access control engine to decide if the delegatee should be authorized to receive the requested services, and record the transaction.

The delegation statement in the authentication assertion provided by the IdP is not an authorization of delegation. Instead the IdP vouches that the delegator indeed has delegated some tasks to the delegatee. It is the service provider's responsibility to consult its access control engine to decide if the delegatee should be authorized to receive the requested services, and to record the transaction.

The delegatee must have an account at the IdP. Otherwise, the IdP cannot identify and authenticate the delegatee.

The service providers' access control policies dictate whether the delegatee must have an account at their websites.

Thanks to the invention, the delegator can digitally sign the delegation (mandate) providing non-repudiation. The Identity Provider manages delegations for all service providers who have registered with the IdP and expressed permission and policies of delegation in their metadata. Standard protocols are used between IdP and SPs, such as SSL/TLS, SAML, and SACML. Service providers have to authorize any delegations. The IdP can get authorization from service providers before creating mandates. Non-repudiation is provided by digital signature. The delegator can specify constraints, such as valid period.

The invention claimed is:

1. A method for providing user-to-user delegation service in federated identity environment, comprising:
   receiving, at an identity provider, a delegation assignment from a first user, delegator, the delegation assignment specifying a service provider, privilege or task to delegate to be performed at the service provider, and a second user, delegatee,
   operating the identity provider to authenticate the second user, the delegatee, if the authentication step is successful and if the identity provider finds delegations for the second user, the delegatee, providing the second user, the delegatee, a mechanism from which to choose which delegation to perform, therefrom receiving a delegation selection from the second user, and embedding, by the identity provider, a delegation assertion corresponding to the delegation selection in the authentication step and sending the delegation assertion to the service provider,
   in response to receiving the delegation selection from the second user, the delegatee, operating the service provider to authorize the delegations based on access control rules of an access control engine of the service provider; and
   associating a delegation invocation step with the user authentication step by:
      a. receiving a login request from the second user, the delegatee, at the service provider, and
      b. operating the service provider to delegate authentication of the second user, the delegatee, to the identity provider.

2. The method according to claim 1, wherein the delegation is a simple delegation, applicable to a discretionary access control model, wherein the first user, the delegator, gives all privileges to the second user, the delegatee, for a specified time period.

3. The method according to claim 1, wherein a delegation policy is in a metadata stored in the service provider, applicable to discretionary and role-based access control models, wherein during the assignment step, checking, by the identity provider, the delegation policy.

4. The method according to claim 1, wherein the delegation is applicable to any access control models, wherein the method comprises the identity provider asking the service provider dynamically for privileges that the first user, the delegator, can delegate to the second user, the delegatee.

5. The method according to claim 2, wherein the method comprises a delegation revocation step comprising the identity provider providing means for the first user, the delegator, to revoke a delegation, said revocation being the responsibility of the first user, the delegator, at the identity provider.

6. The method according to claim 4, wherein the method comprises a delegation revocation step comprising the identity provider removing the delegation to the second user, the delegatee, by the first user, the delegator, from the identity provider's record of the delegation.

7. The method according to claim 4, comprising operating the service provider to initiate revocation of the delegation.

8. The method according to claim 4, comprising the identity provider cleaning up the delegation repository periodically.

9. A system for providing user-to-user delegation service in federated identity environment comprising an identity provider, more than one service providers, user-delegators, and user-delegatees, wherein the identity provider acts as the delegation authority, managing delegations for the service providers, wherein the identity provider:
receives delegation assignments specifying service provider, privilege or task to delegate to be performed at a service provider and a user-delegatee from user-delegators,
authenticates the user-delegatee, if the authentication step is successful and if the identity provider finds delegations for the user-delegatee, providing the user-delegatee a mechanism from which to choose which delegation to perform, therefrom receiving a delegation selection from the user-delegatee, and embedding, by the identity provider, a delegation assertion corresponding to the delegation selection in the authentication step and sending the delegation assertion to the service provider thereby informs service providers of delegation selections,
associating a delegation invocation step with the user authentication step by:
  a. receiving a login request from the user-delegatee at the service provider, and
  b. operating the service provider to delegate authentication of the user-delegatee to the identity provider, and wherein
the service providers authorize delegations based on access control rules of an access control engine of the service provider.

10. The system for providing user-to-user delegation in federated identity environment of claim 9 wherein a user-delegator performs a delegation or assignment step by specifying said delegation at an identity provider for delegating a privilege or task to a user-delegatee to be performed at a service provider.

11. The system for providing user-to-user delegation service in federated identity environment of claim 9 wherein:
  a. the user-delegatee is operable to request to login at the service provider, which delegates the user authentication to the identity provider;
  b. the identity provider is operable to authenticate the user-delegatee, and if the authentication step is successful and if the identity provider finds delegations for the user-delegatee, the user-delegatee is operable to choose which delegation to perform;
thereby associating a delegation invocation step with a user authentication step.

* * * * *